March 6, 1951     C. B. KEYS     2,544,504
DEMOUNTABLE LEG
Filed June 15, 1946
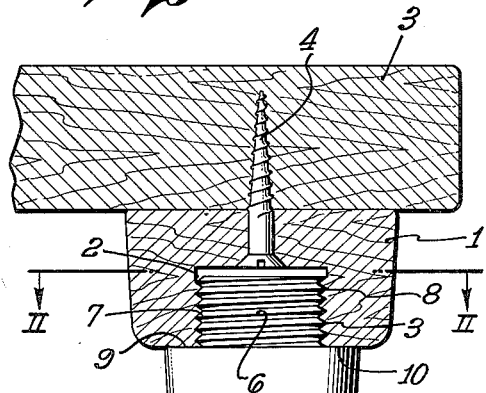
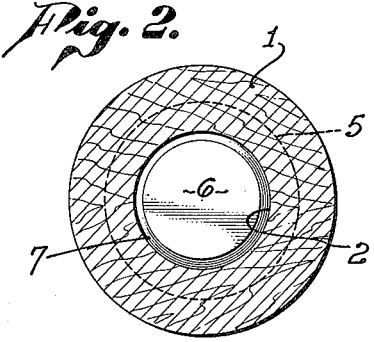
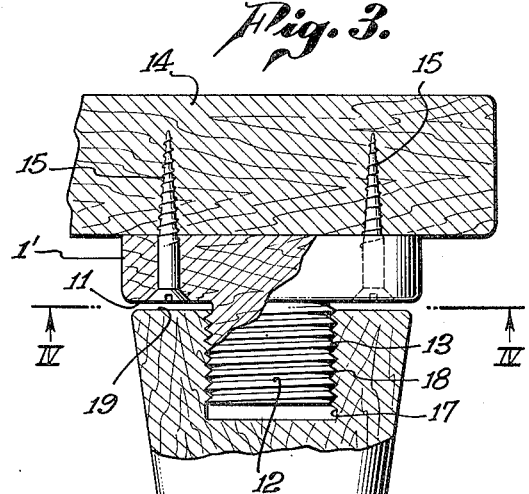
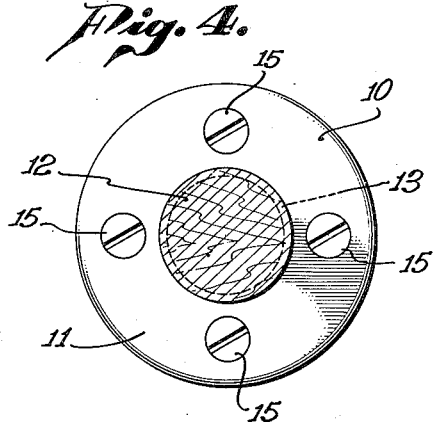
INVENTOR.
Clarence Brant Keys
BY
ATTORNEY.

Patented Mar. 6, 1951

2,544,504

UNITED STATES PATENT OFFICE 2,544,504

DEMOUNTABLE LEG

Clarence Brant Keys, Sherman Oaks, Calif.

Application June 15, 1946, Serial No. 676,992

2 Claims. (Cl. 287—20)

This invention relates generally to demountable members which may be removably attached to a primary object and more specifically to a demountable leg adapted to be removably mounted on a supportable member or object, such as for example, a piece of furniture, or the like.

In the process of moving furniture and the like a great deal of trouble is often occasioned by the fixed legs projecting from the furniture, since when moving a piece of furniture through a constricting or narrow opening or around a bend, such as for example moving a large davenport or sofa through a narrow door, the legs oftentimes will be caught. This may result in serious damage, such as scarring or injuring the wall or woodwork or breaking the leg off the furniture, etc.

It would be of great advantage to have a demountable leg which could readily be removed when desired, such as when moving the furniture. The same situation is true when furniture or the like is being shipped, since the furniture may be so stored or arranged in the moving van, railroad car, or the like that considerable damage may result from the protruding legs. This is also true when storing furniture permanently. Under all of the above-mentioned circumstances it would be very desirable to be able to remove the legs before moving or storing of said furniture.

Furthermore, such a demountable leg would be of great advantage in the field of demountable or knock-down furniture or the like of the type which may be completely taken apart so as to be stored in a smaller space for shipping, moving, storing, and the like.

Also, oftentimes in furniture with fixed legs, warping occurs, or the floor upon which the furniture is resting may be warped so that the furniture is unstable, resting only on a part of the total number of legs supporting said piece of furniture so that wobbling may readily occur. Under such circumstances it would be extremely desirable to have an adjustable leg which could readily be adjusted so as to conform to the warping that has taken place in either the floor or the furniture and thus give stability to the piece of furniture.

It would also be of great advantage to provide demountable handles, knobs, or the like, which might readily be removed when desired. Such handles would have numerous advantages similar to those hereinabove set forth.

With the above points in mind, it is an object of the present invention to provide a demountable leg adapted to be attached to a supportable member or object and which may readily be removed when so desired.

It is a further object of this invention to provide an adjustable leg for attaching to a supportable member or object, the length of which may readily be adjusted when so desired.

It is a further object of this invention to provide a demountable, adjustable leg adapted to be attached to a supportable member or object which may readily be removed when so desired and the length of which may be adjusted at will.

It is a further object of this invention to provide a demountable member or handle adapted to be attached to a primary member and which may readily be removed when so desired.

It is a further object of this invention to provide an adjustable demountable member for attaching to a primary member or object which may be removed when so desired and which may be adjusted with respect to said primary object or member when so desired.

It is a further object of this invention to provide a demountable leg for supporting furniture or the like.

It is a further object of this invention to provide an adjustable leg for attaching to furniture or the like.

Referring to the drawings:

Fig. 1 is a front sectional elevation of the first embodiment of my invention.

Fig. 2 is a sectional plan view taken along the plane II—II of Fig. 1.

Fig. 3 is a front sectional elevation of a second embodiment of my invention.

Fig. 4 is a sectional plan view taken along the plane IV—IV of Fig. 3.

Generally speaking, the first preferred embodiment of this invention comprises a base provided with attaching means, such as a screw for example, for attaching said base to a member to be supported, such as a piece of furniture, or the like. The base is also provided with an interiorly threaded bore adapted to threadably receive an exteriorly threaded stud which is formed integrally with a foot. Said foot has a shoulder thereon adapted to abut an abutting surface on the bottom of said base.

More specifically, as shown in Fig. 1, a circular base 1 provided with an interior bore 2 open at one end and closed at the other, said bore being interiorly threaded at 8, is fixed to the under surface of a suitable support member, primary object, or piece of furniture 3 by means of an upwardly directed screw 4 mounted within the bore 2. Screw 4 passes through the closed end of said bore 2 and into the supportable member 3. Thus the flat top of base 1 is rigidly seated upon and locked to the under surface of the piece of furniture 3.

A foot 5 is provided with an integral, upwardly directed stud 6 which is exteriorly threaded at 7, said stud being of reduced diameter compared to the foot 5, thus forming an annular shoulder at 9 which abuts an annular abutting surface 10 on the lower side of the base 1.

Thus it can be seen that the base 1 is fixedly attached to the piece of furniture or the like to be supported and the foot 5 may be screwed into said base 1 for mounting the leg. The foot 5 may be threadably removed from the base 1 at will.

Furthermore, the total, overall height of the leg may be adjusted at will by rotating the foot 5 with respect to the base 1, thus moving the foot 5 longitudinally with respect to the base 1 attached to the piece of furniture to be supported.

The second embodiment of my invention, shown in Figs. 2 and 3 comprises a base 1' provided with annular shoulder 11 and a downwardly directed stud 12 exteriorly threaded at 13. Base 1' is mounted upon and fixed to the under surface of a supportable or primary member or piece of furniture to be supported 14 by means of screws 15 positioned around the annular shoulder 11.

A foot 16 provided with an interior bore 17 which is interiorly threaded at 18 is adapted to threadably engage the exteriorly threaded stud 12. The annular shoulder 11 is adapted to abut annular abutting surface 19 on the upper edge of the foot 16.

It can readily be seen that the base 1' is fixedly attached to the supportable member or piece of furniture 14 by means of the screws and the foot 16 may be removably screwed on to the downwardly directed, integral stud portion thereof. When it is desired to demount the leg the foot 16 may be unscrewed from the stud 12.

Furthermore, the overall height of the leg may be adjusted by rotating the foot 16 with respect to the base 1', thus causing a longitudinal movement of the foot 16 with respect to the base 1'.

Numerous modifications of this idea are possible and are properly included in this invention. For example, the base need not necessarily be attached to the supportable member, primary object, or piece of furniture by an upwardly directed screw or plurality of screws. Any suitable fastening means for fastening the base to the supportable member or piece of furniture may be used. The base shown in Fig. 3 may comprise only the stud portion thereof and have no annular shoulder thereon. Said base may be attached to the supportable member or piece of furniture by any suitable means, such as for example, a screw passing longitudinally through the center thereof into the under side of said supportable member or piece of furniture. In the embodiment shown in Fig. 1, the annular abutting surface of the base and the annular shoulder of the foot may be omitted entirely, if so desired.

Furthermore, in the examples shown, an annular ring of material may be placed between the annular abutting surface of the base and the annular shoulder of the foot for increasing the overall length of the leg without decreasing the strength thereof substantially, or a plurality of such small annular rings might be so positioned.

The base such as 1 with its connecting screw 4 and leg 5 may be sold as a unit for use in building or reconditioning furniture, the unit being readily attachable by anyone capable of using a screwdriver. The examples employed herein are for illustrative purposes only and are not intended to limit the scope of this invention. This invention is limited only by the scope of the claims appended hereto.

I claim:

1. A demountable leg for attaching to a supportable member comprising: a foot provided with an annular supporting shoulder adjacent the upper end thereof and an upwardly extending, exteriorly threaded stud of reduced diameter; a base provided with an interiorly threaded bore adapted to receive said exteriorly threaded stud and provided with an annular, flat, abutting surface surrounding the bore and adapted to contact said supporting shoulder, said abutting surface being of larger area than the annular supporting shoulder, said base including a rear, flat face in a plane parallel to such annular surface, said interiorly threaded bore extending only partly into said base, and a detachable fastening means extending axially through the base through the rear face thereof for removably attaching said base to a supportable member, said fastening means being completely concealed when the stud and bore are in threaded engagement.

2. A demountable leg for attaching to a supportable member comprising: a foot provided with an annular supporting shoulder adjacent the upper end thereof, said foot being provided with a threaded portion; a base including a threaded portion adapted to engage the threaded portion of said foot, a lower, annular, abutting surface arranged to contact the foot and of larger area than the supporting annular shoulder of said foot, a rear flat face; and axially directed means for removably attaching said base to a supportable member, said means being completely concealed when said threaded portions of the base and the foot are in engagement.

CLARENCE BRANT KEYS.

REFERENCES CITED

The following references are of record in the file of this patent:

UNITED STATES PATENTS

| Number | Name | Date |
| --- | --- | --- |
| 156,310 | Postawka | Oct. 27, 1874 |
| 281,245 | Degenhart | July 17, 1883 |
| 1,886,112 | Luarde | Nov. 1, 1932 |